UNITED STATES PATENT OFFICE.

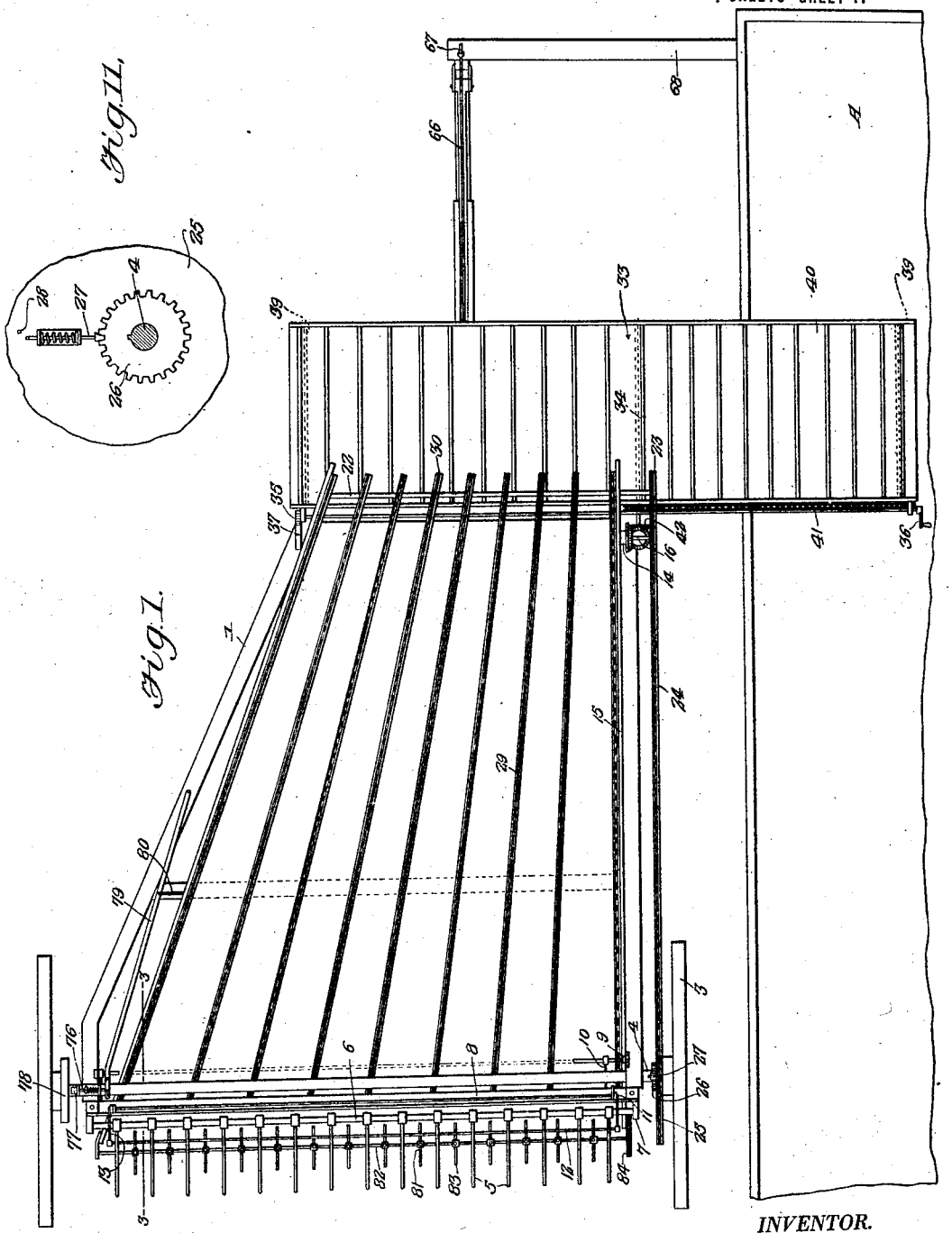

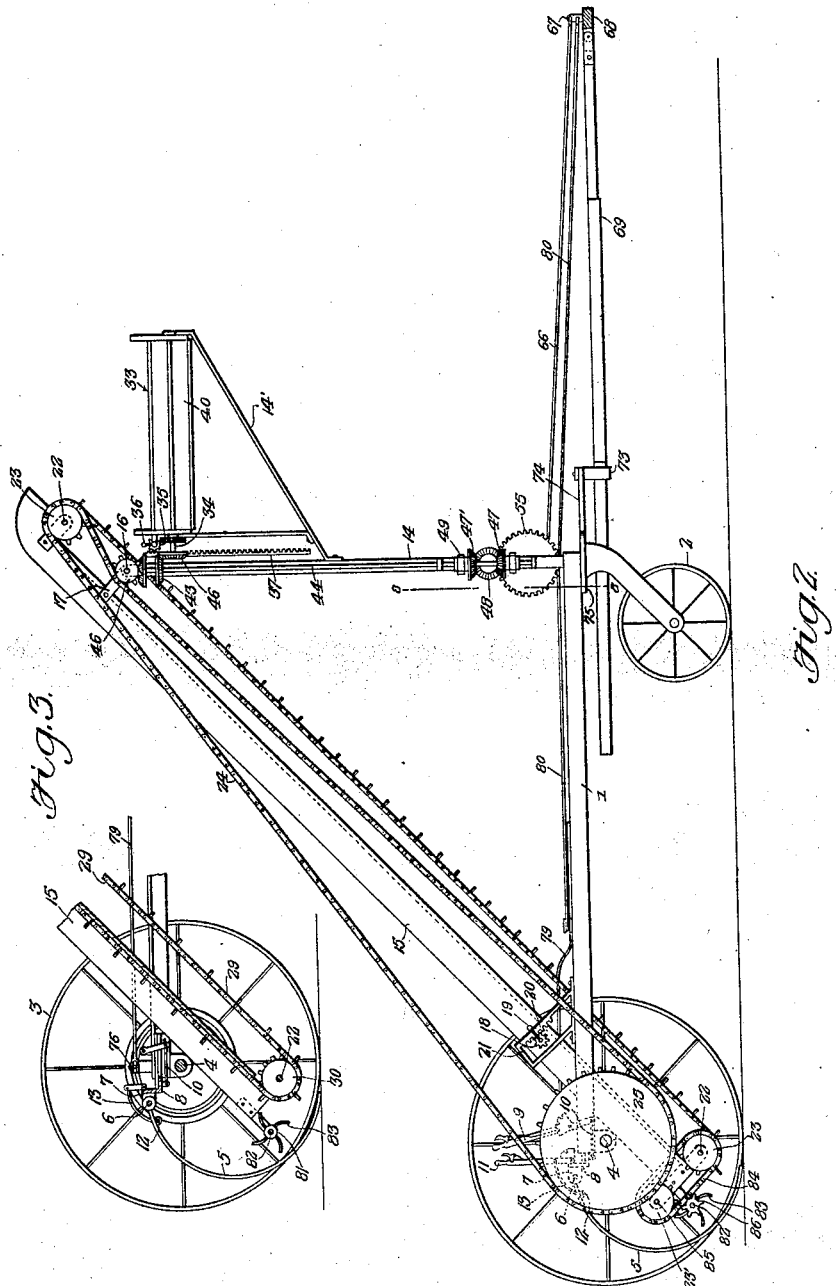

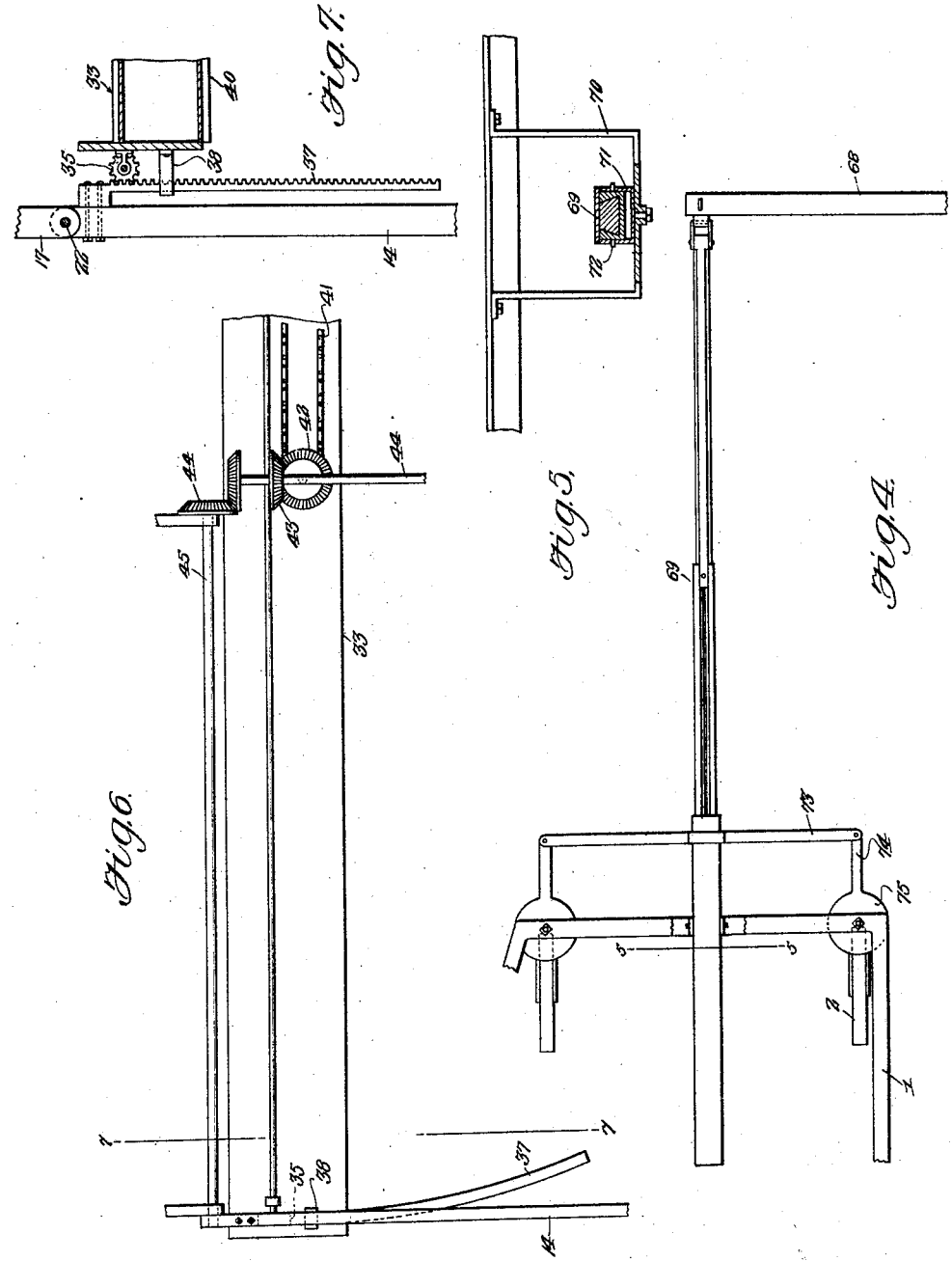

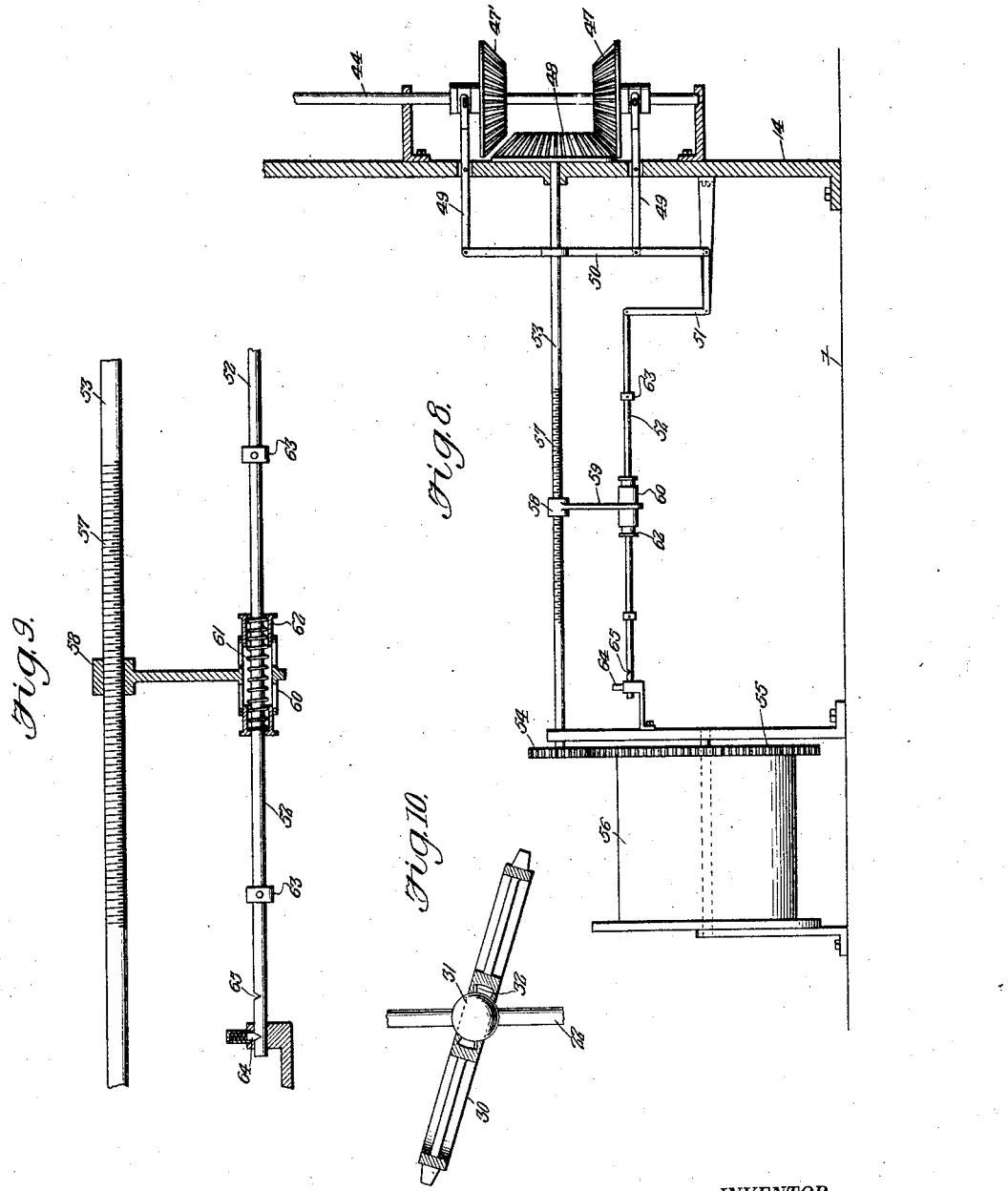

OWEN H. EILER, OF PHILADELPHIA, PENNSYLVANIA.

HAY LOADER.

1,406,946. Specification of Letters Patent. Patented Feb. 14, 1922.

Application filed August 4, 1919, Serial No. 315,224. Renewed July 11, 1921. Serial No. 483,945.

*To all whom it may concern:*

Be it known that I, OWEN H. EILER, a citizen of the United States, residing at Philadelphia, in the county of Philadelphia and State of Pennsylvania, have invented new and useful Improvements in Hay Loaders, of which the following is a specification.

This invention relates to improvements in hay loaders and the principal object of the invention is to provide means for distributing the hay upon the way by moving the loader back and forth alongside the wagon.

Another object of the invention is to provide automatic means for moving the loader back and forth along the wagon to evenly distribute the hay.

Still another object of the invention is to provide an adjustable conveyor for carrying the hay from the loader to the wagon.

A further object of the invention is to provide means for causing the hay to compactly bunch together at the top of the loader.

Another object of the invention is to provide means for adjusting the conveyor means of the loader with respect to the ground and also means for adjusting the tines of the rake.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention showing the same attached to a wagon.

Figure 2 is a side elevation of the invention.

Figure 3 is a section on line 3—3 of Figure 1.

Figure 4 is a plan view showing the attachment of the tongue to the loader.

Figure 5 is a section on line 5—5 of Figure 4.

Figure 6 is an edge view of part of the conveyor of the loader showing the means for driving the conveyor and adjusting its inclination.

Figure 7 is a section on line 7—7 of Figure 6.

Figure 8 is a view substantially on the line 8—8 of Figure 2.

Figure 9 is an enlarged detail view showing the means for reversing the rotation of the drum.

Figure 10 is a detail view partly in section showing the means for mounting the wheels of the conveyor of the loader.

Figure 11 is a detail view showing the means for rendering the loader inactive.

In these views 1 indicates the frame of the loader which is provided at its front end with the caster wheels 2 and at its rear end with the ground wheels 3 which are carried by the shaft 4. The tines 5 of the rake are secured to a bar 6 and this bar is carried by the ears 7, which are secured to an adjustable sliding member 8. This member is slidably mounted in the rear end of the frame 1 and is adjustable by means of the hand lever 9 which is connected to said member by the links 10. In this way by moving the hand lever, the sliding member may be moved so as to adjust the position of the rake in relation to the end of the frame. The rake is raised and lowered by means of the lever 11 which is attached to the rod 12, located under the tines, by the curved links 13. At the front of the frame uprights 14 are located to support the upper part of the elevating conveyor 15. The lower part of the conveyor passes between the side members of the frame and under the axle 4. The upper end of the conveyor is pivotally mounted on the supports 14 by means of the shaft 16 and the bracket 17. The lower end of the conveyor may be moved towards and away from the axle 4 by means of the gear 18 carried by the crank 19, which is journaled to the conveyor, and engaging the rack 20 formed on the bracket 21, carried by the frame.

In each end of the conveyor frame is located a shaft 22, which at one end is provided with the chain wheel 23. The wheel 23 carried by the upper shaft is engaged by the driving chain 24 which engages a large chain wheel 25, which is mounted on the axle 4 and which is detachably connected with the axle by means of a small gear wheel 26 connected to said axle and a spring plunger 27 carried by the wheel 25 and adapted to engage the wheel 26 to lock the wheels together. When it is desired to move the loader without operating the conveyor, the plunger may be raised out of engagement with the wheel 26 so that the ground wheels may move without operating the conveyors. This plunger may be held in inoperative position by having its bent end engaging the pin 28 carried by the wheel 25.

The endless conveyor chains 29 pass over the chain wheels 30 carried by the shafts 22. As shown in Figure 10, each wheel 30 is connected with the shaft by a spherical part 31 on the shaft engaging a circular hub 32 of the wheel, said parts being connected together by the pin and slot connection 32 so as to provide a universal joint between the wheel and shaft. In this way the wheels 30 may have rocking movement on the shafts. This arrangement of parts is provided so that the wheels on the upper shaft 22 may be arranged closer together than the wheels on the large shaft so that the endless chains will be convergent at the upper end of the conveyor, as clearly shown in Figure 1, so that the hay being elevated will be bunched together at the top of the conveyor.

The hay elevated by the conveyor will be delivered to a cross conveyor 33 which is adjustably supported at the upper portion of the uprights 14 by the frame 14′. This frame 14′ has journaled therein a shaft 34 which passes through the center of the cross conveyor so that said conveyor is tiltably supported thereon. One end of the conveyor is provided with a toothed wheel 35 which is adapted to be actuated by a crank 36 and which engages a rack 37 carried by one of the uprights 14. In this way when the crank is rotated the wheel 35 engaging the rack will adjust the inclination of the cross conveyor. A guiding bracket 38 is carried by the conveyor frame and engages the rack bar.

The conveyor 23 is a belt conveyor and includes the usual rollers at the ends of the conveyor frame, the shafts of these rollers being shown at 39, and the slatted belt 40 passing over the rollers. This belt is driven by means of the endless chain 41, passing over chain wheels carried at one end of the shaft 34. The other end of this shaft is provided with a beveled gear 42 which meshes with a like gear 43 secured to an upright shaft 44. The shaft 44 is driven by means of the main driving chain 24 through the pinions 44, the shaft 45 and the chain wheel 46 on said shaft 45 and with which the chain 24 engages.

The lower part of shaft 44 is provided with a pair of pinions 47 and 47′ which are slidably mounted on said shaft so that one or the other may be placed in engagement with a pinion 48 when desired. These pinions will be moved on the shaft by means of levers 49 pivoted intermediate their ends to a part of the frame and having their free ends suitably connected with the pinions, as shown in Figure 8. The other ends of the levers are pivoted to a rod 50, which has one end connected with a bell crank lever 51 which is adapted to be moved by the reciprocating rod 52. This rod is reciprocated in the following manner. The pinion 48 is connected to a shaft 53 which is slidably supported in the frame and which carries a pinion 54, which engages with an annular rack 55 on the drum 56. This shaft 53 is provided with a screw threaded portion 57 with which engages a screw threaded collar 58. This collar has an arm 59 which carriers a cylindrical casing 60 through which the rod 52 passes. A coiled spring 61 is located in said casing and surrounds the rod 52. The casing is provided with movable end pieces 62 which are held in extended position by the spring. Collars 63 are adjustably mounted on the rod 52 and are so arranged that they will be struck by the ends of the casing when the rotation of the shaft 53 brings the collar and casing adjacent the ends of the screw threaded portion 57. When the casing strikes one of these collars the movable end piece will be forced inwardly and thus the spring will be compressed, and this compression of the spring will tend to move the rod 52. This movement of the rod is resisted by a spring pressed pin 64 carried by a part of the frame and having its pointed end engaging one of the two notches 65 formed in the rod 52. This pin normally holds the rod against movement, but when the compression of the spring 61 overcomes the resistance of this pin the rod will be moved until the pin engages the other notch 65. This movement of the rod 52 will shift the pinions 47 and 47′ so as to move one of the pinions out of engagement with the pinion 48 and the other pinion into engagement with the pinion 48. Thus the rotation of the drum 56 will be reversed.

A cable 66 is carried by said drum and the other end of the cable is connected to a lug 67 located on a cross piece 68 projecting from one side of the wagon A. The loader is also connected with the said piece 68 by means of the pole 69 which is of telescopic construction. In this way when the drum is being rotated in a direction to wind up the cable the loader will be moved forwardly alongside the wagon and then when the rotation of the drum is reversed the loader will drop back towards the rear of the wagon.

The tongue is pivotally connected to a depending frame 70 carried by the frame 1 of the loader, as shown in Figure 5, by the U-shape bracket 71, and said tongue may have vertical rocking movement in said bracket by means of the pins 72 connecting the tongues to said bracket. The tongue is further provided with a cross piece 73 which has its ends connected with the arms 74 carried by the rotatable members 75 connected with the frame of the loader.

I provide braking means for the loader and such means consist of a spring pressed rod 76 suitably carried in the frame and having a shoe 77 thereon, which is adapted to engage with the brake drum 78 carried by one of the ground wheels. The pressure of the spring acting to place the shoe against the drum is sufficient to cause a braking action upon the wheel. This shoe is normally held out of engagement with the drum by means of the lever 79 and the cable 80 having one end connected with said lever and its other end connected with the lug 67 on the piece 68. This cable 80 must be so adjusted that as long as the loader is being pulled by the wagon the lever 79 is held in such a position that the brake shoe is out of engagement with the brake drum. If the loader should be moving faster than the wagon, caused by running down a hill or the like, the cable would slack and thus permit the spring rod to shift the shoe against the brake drum and thus apply the brake.

I provide means for cleaning the hay from the rake, such means consisting of a plurality of wheels 81 located on the shaft 82 and provided with curved arms 83. Each of these wheels is located between a pair of tines so that as they revolve the arms will clear the hay from the rake. The shaft 82 is driven by means of an endless chain 84 passing over the wheel 23 of the lower shaft 22 and a wheel 23' on a shaft 85, and engaging a chain wheel 86 located on the shaft 82.

It will thus be seen that the loader will be automatically moved back and forth alongside the wagon so as to evenly distribute the hay upon said wagon. The arrangement of the elevating chains will cause the hay to bunch at the upper end of the elevating conveyor so that it will be delivered to the wagon in a compact mass.

It will also be seen that the parts are adjustable so that the loader may be made to suit varying conditions of the ground and the crop.

By my invention under favorable conditions one man may handle the entire device, though, of course, it is preferable to have two men, one man to drive and the other to attend to the loader.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a wagon, a hay loader comprising a frame, an elevating conveyor thereon, a cross conveyor for receiving the hay from the first conveyor, means for attaching the loader to the side of the wagon and means for moving the loader back and forth alongside the wagon to evenly distribute the hay.

2. In combination with a wagon, a hay loader comprising a frame, an elevating conveyor thereon, a cross conveyor for receiving the hay from the first conveyor, means for attaching the loader to the side of the wagon and automatic means for moving the loader back and forth along the wagon to evenly distribute the hay thereto.

3. In combination with a wagon, a hay loader comprising a frame, an elevating conveyor thereon, a cross conveyor for receiving the hay from the first conveyor, means for attaching the loader to the side of the wagon, automatic means for moving the loader back and forth along the wagon and means for adjusting both conveyors.

4. In combination with a wagon, a hay loader comprising a frame, an elevating conveyor thereon, a cross conveyor for receiving the hay from the first conveyor, means for attaching the loader to the side of the wagon, automatic means for moving the loader back and forth alongside the wagon to evenly distribute the hay thereto and means for clearing the hay from the tines of the rake.

5. In combination with a wagon, a hay loader comprising a frame, an elevating conveyor thereon, a cross conveyor for receiving the hay from the first conveyor, means for attaching the loader to the side of the wagon, automatic means for moving the loader back and forth along the wagon, and means for bunching the hay at the top of the elevating conveyor.

6. In combination with a wagon, a hay loader comprising a frame, an elevating conveyor located thereon, a cross conveyor for receiving the hay from the first conveyor, means for attaching the loader to the side of the wagon and means for moving the loader back and forth alongside the wagon, said means consisting of a drum, a cable thereon, means for connecting the cable to the attaching means on the wagon, means for rotating the drum from the driving means of the loader and means for automatically reversing the rotation of the drum.

7. In combination with a wagon, a hay loader comprising a frame, an elevating conveyor thereon, a cross conveyor for receiving the hay from the first conveyor, means for attaching the loader to the side of the wagon including a telescopic tongue connected with the loader, a projecting piece connected with the side of the wagon and to which the tongue is connected, a drum on the loader, means for rotating the same from the driving means of the loader, a cable connecting the drum with the piece to which the end of the telescopic tongue is connected, and means for automatically reversing the rotation of the drum.

8. In combination with a wagon, a hay loader comprising an elevating conveyor and a cross conveyor, a supporting frame for said conveyors, ground wheels for said frame, means for driving the conveyors from one of said ground wheels, a telescopic tongue connected with the frame and adapted to be connected to a cross piece projecting from the side of the wagon, a drum, a cable thereon, having one end connected with the said cross piece, a rotatable shaft, means for connecting the same with the drum, a pinion on said shaft, a second shaft connected with the driving means, a pair of pinions slidably mounted on said second shaft, a system of levers for moving said pinions into and out of engagement with the pinion on the rotatable shaft, a reciprocating rod connected with said system of levers, a spring pressed pin normally holding said rod against movement, a casing carried by said rod and having sliding end pieces, a spring in said casing engaging with the end pieces, collars on said reciprocating rod adapted to be struck by said end pieces, said drum operating shaft having a screw threaded part thereon and a screw threaded collar engaging said pin and connected with the casing.

In testimony whereof I affix my signature.

OWEN H. EILER.